(12) United States Patent
Katayama et al.

(10) Patent No.: US 8,377,300 B2
(45) Date of Patent: Feb. 19, 2013

(54) FLUID SEPARATION ELEMENT, ANTI-TELESCOPING DEVICE FOR FLUID SEPARATION ELEMENT, AND FLUID SEPARATION DEVICE

(75) Inventors: Akira Katayama, Ehime (JP); Toshimasa Katayama, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/147,716

(22) PCT Filed: Feb. 4, 2010

(86) PCT No.: PCT/JP2010/051590
§ 371 (c)(1),
(2), (4) Date: Aug. 3, 2011

(87) PCT Pub. No.: WO2010/090251
PCT Pub. Date: Aug. 12, 2010

(65) Prior Publication Data
US 2011/0290711 A1 Dec. 1, 2011

(30) Foreign Application Priority Data
Feb. 6, 2009 (JP) .................. 2009-025701

(51) Int. Cl.
*B01D 63/10* (2006.01)
*B01D 63/12* (2006.01)
*B01D 27/00* (2006.01)
*F16L 21/02* (2006.01)

(52) U.S. Cl. .............. 210/232; 210/321.74; 210/321.83; 210/323.1; 210/497.1; 277/549; 277/567; 277/626

(58) Field of Classification Search .................. 210/232, 210/321.74, 321.83, 323.1, 497.1; 277/549, 277/560, 562, 567, 602, 626
See application file for complete search history.

(56) References Cited

U.S. PATENT DOCUMENTS

| | | | |
|---|---|---|---|
| 5,128,037 A * | 7/1992 | Pearl et al. | 210/321.74 |
| 2005/0057002 A1* | 3/2005 | Chikura et al. | 277/549 |
| 2006/0049093 A1 | 3/2006 | Chikura | |
| 2007/0017860 A1 | 1/2007 | Chikura | |
| 2009/0188855 A1 | 7/2009 | Chikura | |

FOREIGN PATENT DOCUMENTS

| | | |
|---|---|---|
| JP | 5843903 | 3/1983 |
| JP | 11267467 | 10/1999 |
| JP | 2005111473 | 4/2005 |
| JP | 2006212514 | 8/2006 |

OTHER PUBLICATIONS

International Search Report for PCT/JP2010/051590 dated Mar. 9, 2010.

* cited by examiner

*Primary Examiner* — John Kim
(74) *Attorney, Agent, or Firm* — RatnerPrestia

(57) ABSTRACT

A fluid separation element is provided including: a membrane winding having two ends and obtained by layering a separation membrane, a feed water channel material, and a permeate channel material and spirally winding them; and one or more anti-telescoping devices attached to one or both of the ends of the membrane winding, wherein a brine seal fitting groove is provided in an outer circumferential surface of the anti-telescoping device and a hole that communicates with a feed water channel side is provided inside the groove. When the anti-telescoping devices are attached to the both ends of the membrane winding, a brine seal is fitted into the groove of the upstream-side anti-telescoping device and no brine seal is fitted into the groove of the downstream-side anti-telescoping device.

8 Claims, 4 Drawing Sheets

FLUID SEPARATION ELEMENT, ANTI-TELESCOPING DEVICE FOR FLUID SEPARATION ELEMENT, AND FLUID SEPARATION DEVICE

CROSS-REFERENCE TO RELATED APPLICATIONS

This application is the U.S. National Phase application of PCT International Application No. PCT/JP2010/051590, filed Feb. 4, 2010, and claims priority of Japanese Patent Application No. 2009-025701, filed Feb. 6, 2009, the disclosures of these applications being incorporated herein by reference in their entirety for all purposes.

FIELD OF THE INVENTION

The present invention relates to a fluid separation element appropriately used in a fluid separation device such as a reverse osmosis device, a nanofiltration device, an ultrafiltration device, or a microfiltration device.

BACKGROUND OF THE INVENTION

In various fields such as seawater desalination and ultrapure water production for semiconductor manufacturing and further general-purpose brackish water desalination, organic matter separation, and wastewater recycle, various fluid separation devices using separation membranes are used to obtain permeate that has passed through the membrane or condensate as a valuable product. Such a fluid separation device generally comprises a fluid separation element using a separation membrane and a pressure vessel into which the fluid separation element is loaded.

Examples of such a fluid separation element using a separation membrane include a fluid separation element using a hollow fiber membrane, a plate frame-type fluid separation element and a spiral-type fluid separation element using a flat sheet membrane.

A spiral-type fluid separation element has a structure in which a separation membrane, a permeate channel material, and a feed liquid channel material are spirally wound around a water collection tube. An example of a fluid separation element having such a structure is shown in FIG. 1.

The fluid separation element shown in FIG. 1 uses an envelope-shaped membrane comprising a first separation membrane 13 and a second separation membrane 14. The envelope-shaped membrane is formed by bonding two membranes together at three sides or by folding a membrane in two. A permeate channel material 15 is inserted into the envelope-shaped membrane. The envelope-shaped membrane having the permeate channel material 15 therein and a feed water channel material 16 form one unit. A membrane winding 1 is formed by spirally winding the unit around a water collection tube 11 or by layering the two or more units and spirally winding the layered units around the water collection tube 11. The envelope-shaped membrane opens on the water collection tube 11 side. Two anti-telescoping devices 2 are attached to both longitudinal ends of the membrane winding 1.

Feed water 12 flows from one of the ends of the fluid separation element into the membrane winding 1 through the upstream-side anti-telescoping device 2u. The feed water 12 is separated into permeate 18 that has passed through the first separation membrane 13 and the second separation membrane 14 and condensate 17 that has not passed through the first separation membrane 13 and the second separation membrane 14. The permeate 18 having passed through the separation membranes 13 and 14 flows through the permeate channel material 15, and is collected by the water collection tube 11 and discharged from the fluid separation element. On the other hand, the feed water 12 not having passed through the separation membranes 13 and 14 passes through the downstream-side anti-telescoping device 2d, and is discharged through the other end of the fluid separation element as the condensate 17.

The outer circumferential surface of the membrane winding 1 of the spiral-type fluid separation element is generally twisted and hardened into a shell by a fiber reinforced plastic (FRP) composed of glass fiber and epoxy resin.

A sealing member called "brine seal" is attached to the outer circumferential surface of the upstream-side anti-telescoping device 2u attached to the fluid separation element. When feed water is allowed to flow into the fluid separation element housed in the pressure vessel, the brine seal prevents the feed water from flowing into the gap between the FRP shell provided outside the fluid separation element and the pressure vessel, that is, prevents the short-pass of the feed water.

In order to attach an annular brine seal, a groove is provided in the outer circumferential surface of the anti-telescoping device. The brine seal is attached by fitting it into the groove (see, for example, JP-A-2005-111473 or JP-A-2006-212514).

The cross-sectional shape of the brine seal fitted into the groove provided in the outer circumferential surface of the anti-telescoping device is not particularly limited, and therefore the brine seal may be, for example, an O-ring or an X-ring, but a U-seal having a U-shaped cross section is often used from the viewpoint of loading the fluid separation element into the pressure vessel. In order to obtain an optimum sealing effect, the U-seal needs to be fitted into the groove so that the upper portion of the U-shape faces the upstream side (feed water inlet side). However, there is a case where the U-seal made of an elastic resin is twisted when fitted into the groove. If the U-seal fitted into the groove of the anti-telescoping device remains twisted, a desired sealing effect cannot be obtained when the fluid separation element is charged into the pressure vessel. For this reason, the twisted U-seal needs to be once removed from the groove to fit the U-seal into the groove again. At this time, the U-seal needs to be removed from the groove without damage to the brine seal and the anti-telescoping device.

Meanwhile, JP-A-2005-111473 proposes that one of the side walls of a brine seal fitting groove is made lower than the other side wall or is partially cut out, but this proposal is not intended to remove a brine seal from the groove. However, also in this case, a tool having a sharp tip needs to be inserted into the groove to remove a sealing material. When a pointed tool is inserted between an anti-telescoping device and a sealing material, both the anti-telescoping device and the sealing material are likely to be damaged. On the other hand, when a sealing material is removed by pressing a tool against a sealing functional part of the sealing material and pulling up the sealing material, the sealing functional part is likely to be damaged.

PATENT DOCUMENTS

Patent Document 1: JP-A-2005-111473
Patent Document 2: JP-A-2006-212514

SUMMARY OF THE INVENTION

The present invention aims to prevent damage to an anti-telescoping device and a brine seal during removal of the brine seal from a groove of the anti-telescoping device and to ease the removal of the brine seal.

A fluid separation element according to an embodiment of the present invention is specified as follows.

(1) A fluid separation element comprising: a membrane winding having two ends and obtained by layering a separation membrane, a feed water channel material, and a permeate channel material and spirally winding them; and one or more anti-telescoping devices attached to one or both of the ends of the membrane winding, wherein a brine seal fitting groove is provided in an outer circumferential surface of the anti-telescoping device, and wherein a hole that communicates with a feed water channel side is provided inside the groove.

(2) The fluid separation element according to the above (1), wherein the anti-telescoping devices are attached to the both ends of the membrane winding, and wherein a brine seal is fitted into the groove of the upstream-side anti-telescoping device and no brine seal is fitted into the groove of the downstream-side anti-telescoping device.

(3) The fluid separation element according to the above (1) or (2), wherein the brine seal is a sealing material having a U-shaped cross section and made of an elastic resin.

(4) An anti-telescoping device for fluid separation element, comprising a brine seal fitting groove provided in an outer circumferential surface thereof, wherein a hole that communicates with a feed water channel side is provided inside the groove.

(5) The anti-telescoping device for fluid separation element according to the above (4), wherein a brine seal is fitted into the brine seal fitting groove.

(6) The anti-telescoping device for fluid separation element according to the above (5), wherein the brine seal is a sealing material having a U-shaped cross section and made of an elastic resin.

(7) A fluid separation device comprising: the two or more fluid separation elements according to the above (2) or (3); and a pressure vessel into which the fluid separation elements are loaded in series, wherein the fluid separation elements are connected in such a manner that the adjacent anti-telescoping devices are in contact with each other.

Because the hole that communicates with the feed water channel side is provided inside the brine seal fitting groove of the anti-telescoping device, the back side of a sealing material can be pushed from the feed water channel-side open end of the communication hole. Therefore, the sealing material can be easily removed without damage to the anti-telescoping device and the brine seal by pushing the back side of the sealing material by pressing the tip of a rod-shaped tool inserted into the communication hole through the feed water channel-side open end of the communication hole against the back side of the sealing material or by blowing compressed air into the communication hole through the feed water channel-side open end of the communication hole.

DETAILED DESCRIPTION OF THE INVENTION

Hereinbelow, an embodiment of a fluid separation element according to the present invention and an embodiment of an anti-telescoping device according to the present invention will be described with reference to the accompanying drawings.

Figure 1:
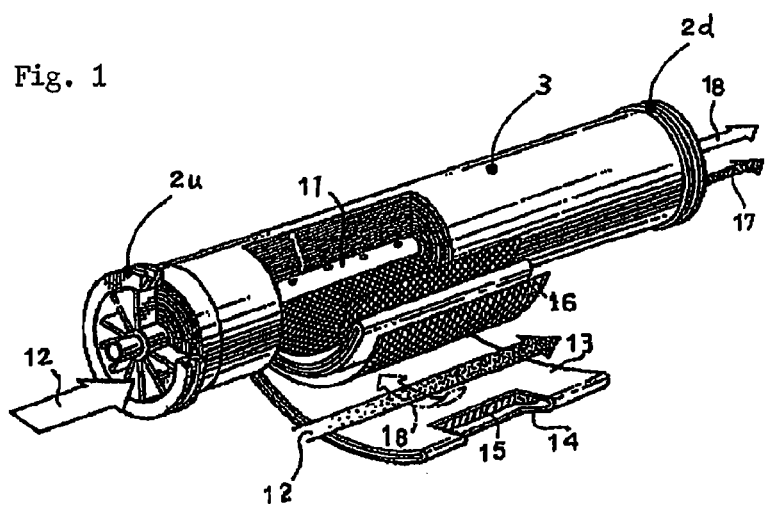
FIG. 1 is a partially cutaway perspective view of one embodiment of a fluid separation element according to the present invention.

As shown in FIG. 1, the fluid separation element according to an embodiment of the present invention comprises a spiral-type membrane winding 1 and anti-telescoping devices 2*u* and 2*d* attached to the both ends of the membrane winding 1. The anti-telescoping device may be attached to one of the two ends of the membrane winding 1. The fluid separation element is loaded into a pressure vessel when used, and therefore a brine seal 28 is attached to the outer circumferential surface of the upstream-side anti-telescoping device 2*u* to prevent the entry of feed water into the gap between the pressure vessel and the fluid separation element.

The membrane winging 1 constituting the fluid separation element is formed by layering units in which a separation membrane, a feed water channel material, and a permeate channel material are layered in a predetermined order and then spirally winding the layered units. The outside of the membrane winding 1 is covered with an outer shell 3 made of a fiber reinforced plastic (FRP). As the separation membrane, a reverse osmosis membrane, a nanofiltration membrane, an ultrafiltration membrane, or a microfiltration membrane is used. At the center of the membrane winding 1, a water collection tube 11 through which collected permeate flows is provided. The water collection tube 11 has a plurality of holes through which permeate flows into the water collection tube 11.

The anti-telescoping device 2 is attached to one or each of the two ends of the membrane winding 1. When the anti-telescoping device 2 is attached to each of the two ends of the membrane winding 1, the brine seal is preferably fitted into a groove of the upstream-side anti-telescoping device.

Figure 2:
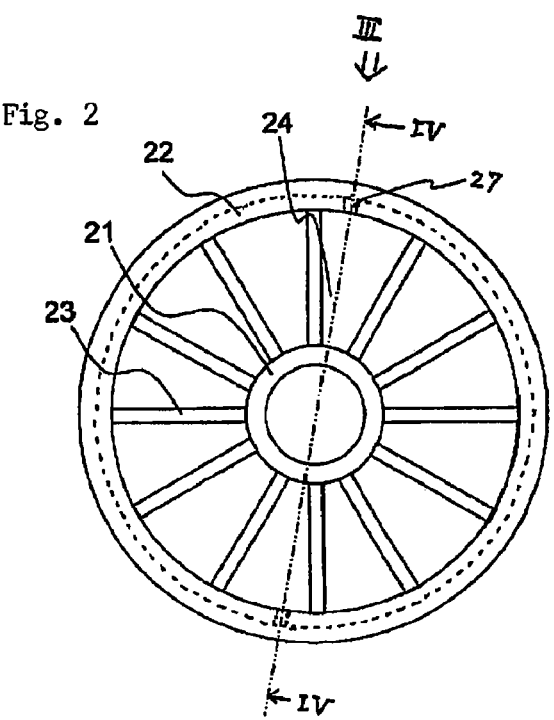
FIG. 2 is a schematic front view of one example of an anti-telescoping device (without a brine seal) for use in the present invention.

The shape of the anti-telescoping device is not particularly limited, and the anti-telescoping device shown in the drawings by way of example is a spoke-type anti-telescoping device. As shown in FIG. 2, the spoke-type anti-telescoping device mainly includes an inner ring portion 21, an outer ring portion 22, and a spoke portion 23. The water collection tube located at the center of the membrane winging is fitted into the inside of the inner ring portion 21. In the outer circumferential surface of the outer ring portion 22, a brine seal fitting groove 25 is provided. The spoke portion 23 connects the inner ring portion 21 and the outer ring portion 22 to each other. Spaces surrounded by the inner ring portion 21, the outer ring portion 22, and the spoke portion 23 serve as a feed water channel 24. The shape of a member that connects the inner ring portion 21 and the outer ring portion 22 to each other is not particularly limited as long as space for the feed water channel can be provided. For example, a perforated plate having two or more circular punched holes may be used.

The anti-telescoping device according to the present invention has the brine seal fitting groove 25 provided in the outer circumferential surface thereof. In addition, a "hole that communicates with the feed water channel side" (hereinafter, referred to as a "communication hole") is provided inside the groove 25.

The brine seal fitting groove 25 is a groove provided in the outer circumferential surface of the outer ring portion 22 and surrounded by two side wall portions 26. The height and thickness (width) of each of the side wall portions 26 and the width and depth of the groove 25 may be set to their optimum values depending on the shape and size of the anti-telescoping device and the shape and size of the brine seal. For example, as shown in the drawings, the two side wall portions 26 preferably have the same height, but the height of one of the two side wall portions 26 may be partially smaller than that of the other side wall portion.

Figure 6:
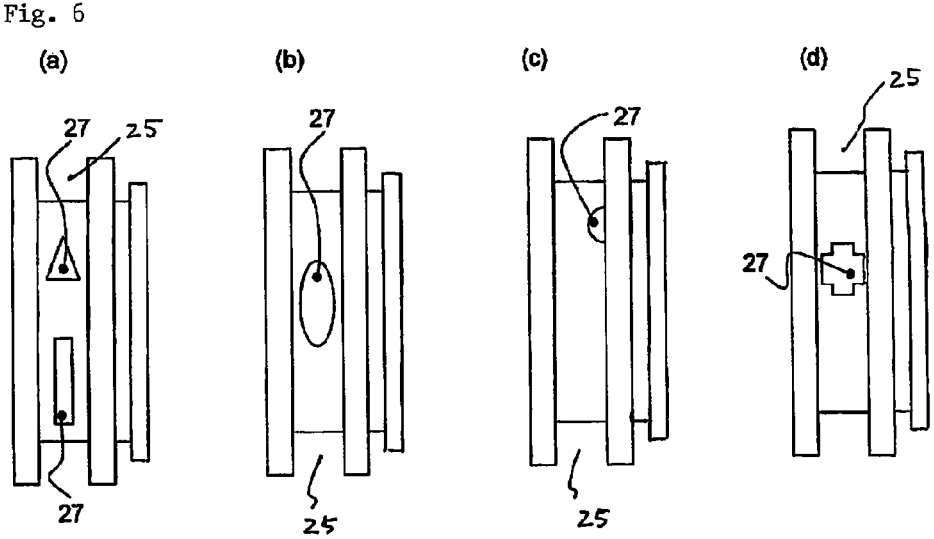
FIGS. 6(*a*) to 6(*d*) are schematic side views each showing another example of the anti-telescoping device (without a brine seal) for use in the present invention.
Figure 7:
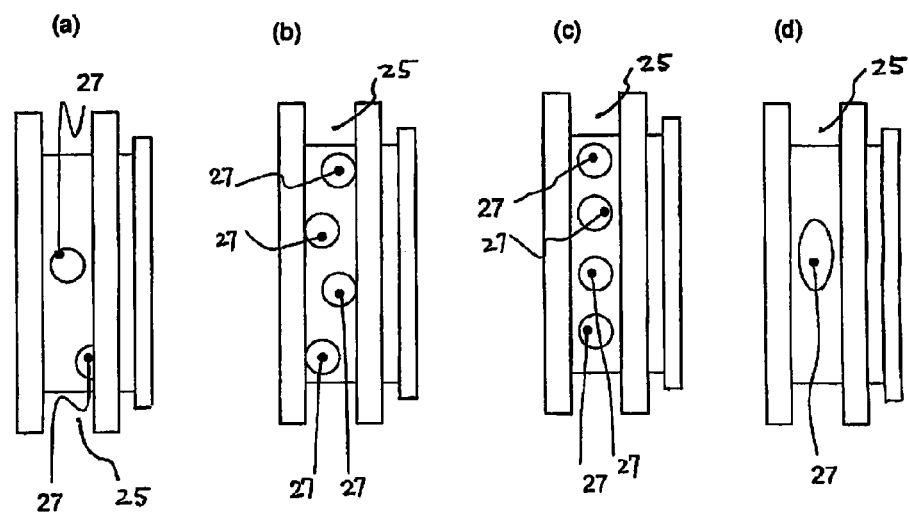
FIGS. 7(*a*) to 7(*d*) are schematic side views each showing yet another example of the anti-telescoping device (without a brine seal) for use in the present invention.

The communication hole 27 is provided inside the groove 25. The communication hole 27 is a hole-shaped space that allows the groove 25 and the feed water channel 24 to communicate with each other. The communication hole 27 preferably has a circular shape (see, for example, FIG. 3) or an oval shape (see, for example, FIG. 6(b)), but may have another shape such as a semi-circle, a triangle, a rectangle, or another polygon. Examples of the shape of the communication hole are shown in FIGS. 6 and 7. The communication hole 27 preferably linearly extends in its depth direction so that a linear hole-shaped space for inserting a rod-shaped tool can be provided.

The size of a hole provided as the communication hole 27 is set to such a value that a rod-shaped tool for pushing out the brine seal can be inserted, the brine seal does not sink, and the strength of the outer ring portion 22 is not impaired. For example, the cross-sectional area of one hole is preferably 0.78 mm$^2$ or more, particularly preferably 3.14 mm$^2$ or more to push out the brine seal. The number of holes may be one or two or more. In order to prevent the brine seal from sinking, the size of one hole is preferably set to a certain value or less. For example, the size of one hole is preferably set to 8% or less of the area of base of the brine seal fitting groove 25. Further, in order to prevent the brine seal from sinking, the length of a hole in the longitudinal direction of the sealing material is preferably set to a certain value or less. For example, the length of a hole in the longitudinal direction of the sealing material is preferably 17% or less of the circumferential length of the brine seal fitting groove 25. Further, in order to prevent the strength of the outer ring portion 22 from being impaired, the number of holes and the total cross-sectional area of holes are preferably minimized. For example, the ratio of the total cross-sectional area of holes to the area of the base of the brine seal fitting groove 25 is preferably 50% or less and the number of holes is preferably 100 or less.

The communication hole 27 is provided inside the groove 25, that is, in the bottom of the groove 25 other than extensions of spokes of the spoke portion 23. It is difficult to provide holes that communicate with the feed water channel side in extensions of spokes of the spoke portion 23. When two or more communication holes are provided, they may be provided inside the groove 25 at substantially regular intervals or two or several communication holes may be provided so as to be adjacent to each other. The two or more holes may be arranged in the same straight line on the circumference of the anti-telescoping device or may be arranged in a staggered manner. Further, the two or more communication holes may have different shapes. Examples of a combination of the communication holes having different shapes include a combination of a circular hole and a polygonal or semi-circular hole and a combination of an oval hole and a semi-circular or polygonal hole.

Figure 5:
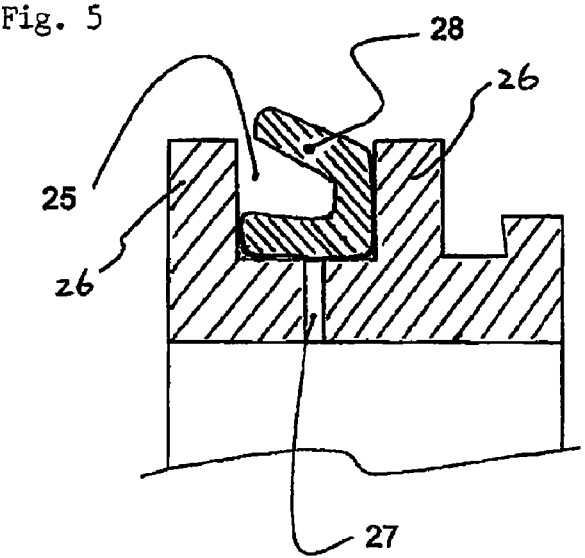
FIG. 5 is a schematic fragmentary enlarged (sectional) view of FIG. 4, showing the anti-telescoping device having a U-seal fitted thereinto.
Figure 8:
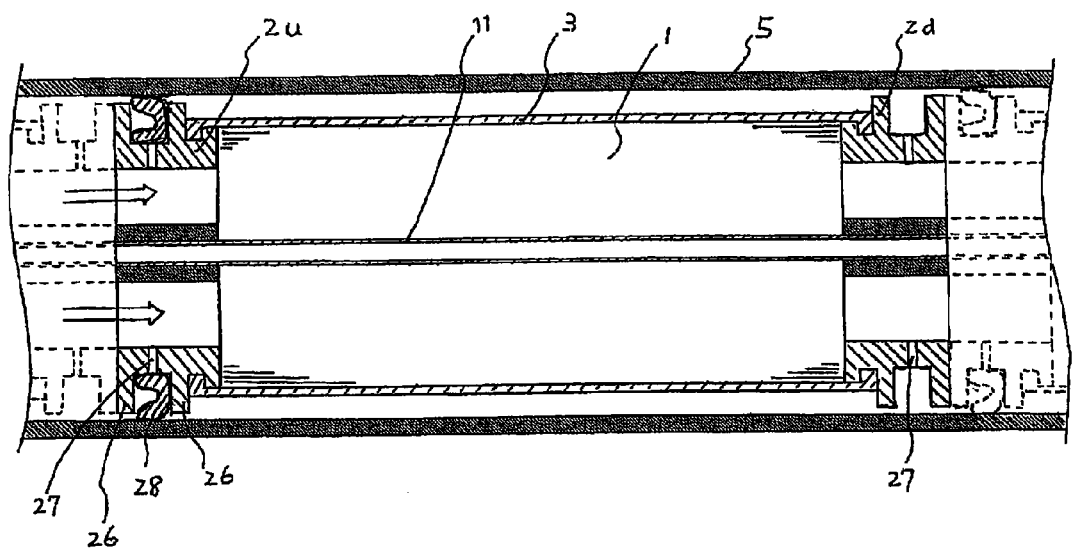
FIG. 8 is a schematic sectional view of the fluid separation elements housed in a pressure vessel, in which the anti-telescoping devices shown in FIGS. 2 to 5 are attached to the both ends of each of the fluid separation elements.

The shape of the brine seal attached to the anti-telescoping device by fitting it into the brine seal fitting groove 25 is not particularly limited as long as the brine seal can be fitted into the groove and can perform a sealing function. A sealing material having a U-shaped cross section (U-seal) such as one shown in FIG. 5 or FIG. 8 is particularly preferred, but an O-ring or an X-ring may be used. Examples of such a sealing material include, but are not limited to, elastic resins such as acrylic rubber (ACM), acrylonitrile butadiene rubber (nitrile rubber, NBR), isoprene rubber (IR), urethane rubber (U), ethylene propylene rubber (EPM, EPDM), epichlorohydrin rubber (CO, ECO), chloroprene rubber (CR), silicone rubber (Q), styrene butadiene rubber (SBR), butadiene rubber (BR), fluororubber (FMK), and polyisobutylene (butyl rubber, IIR).

The brine seal may be fitted into the brine seal fitting groove 25 provided in the outer circumferential surface of the anti-telescoping device according to the present invention by a conventional method, for example, by hand work. When the brine seal is removed, the sealing material may be pushed out of the groove 25 by inserting a round bar-shaped tool into the communication hole 27 from the feed water channel side. Alternatively, pushing the sealing material out of the groove 25 by means of the communication hole 27 may be performed by injecting compressed air into the communication hole 27.

The fluid separation element according to the present invention is used by loading it into a pressure vessel or, as shown in FIG. 8, when the two or more fluid separation elements according to the present invention are used, they are loaded into a pressure vessel in series. In the latter case, the fluid separation elements are connected in such a manner that the adjacent anti-telescoping devices are in contact with each other. FIG. 8 is a sectional view illustrating a case where the two or more fluid separation elements are housed in a pressure vessel 5, in which the anti-telescoping devices are attached to the both ends of each of the fluid separation elements and the brine seal 28 is fitted into the groove of each of the upstream-side anti-telescoping devices 2u. In FIG. 8, feed water flows from the left side to the right side. The U-shaped brine seal 28 is attached to the anti-telescoping device 2u located on the upstream side of the fluid separation element, and therefore the communication hole 27 is blocked by the brine seal 28. Therefore, the flow of feed water in the direction from the feed water channel side to the outer circumferential side of the upstream-side anti-telescoping device 2u is stopped by the brine seal 28. On the other hand, the brine seal 28 is not attached to the anti-telescoping device 2d located on the downstream side, and therefore the communication hole 27 of the downstream-side anti-telescoping device 2d is not blocked. This allows feed water to transfer between the gap between the fluid separation element and the pressure vessel and the feed water channel provided in the fluid separation element through the communication hole 27. As a result, even when the pressure in the fluid separation element is suddenly changed, it is possible to prevent pressure anomalies in the gap between the fluid separation element and the pressure vessel.

Example

Figure 3:
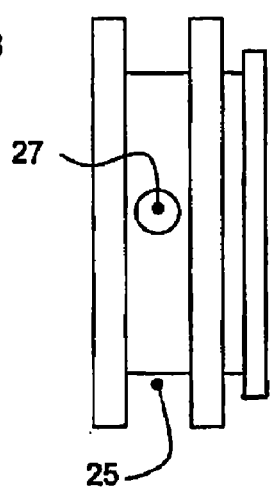
FIG. 3 is a schematic side view of the anti-telescoping device shown in FIG. 2 seen from a direction indicated by an arrow III.
Figure 4:
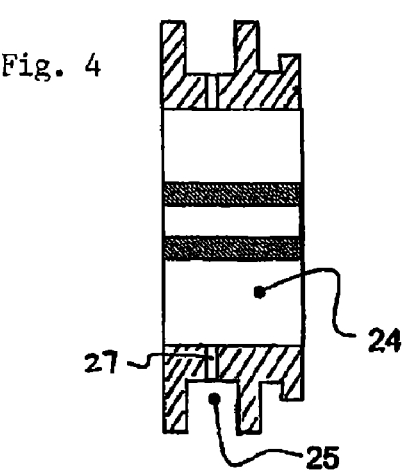
FIG. 4 is a schematic sectional view of the anti-telescoping device shown in FIG. 2 taken along the IV-IV line in FIG. 2.

A spoke-type anti-telescoping device having a shape shown in FIGS. 2 to 4 was produced by conventional resin molding. The anti-telescoping device had an outer diameter of 200 mm, the groove 25 provided in the outer circumferential surface of the anti-telescoping device had a width of 9 mm and a depth of 8 mm, and the communication hole 27 had a circular shape having a diameter of 4 mm.

As shown in FIG. 5, the annular brine seal 28 having a U-shaped cross section and made of ethylene propylene rubber was attached to the anti-telescoping device by fitting it into the groove 25 provided in the outer circumferential surface of the anti-telescoping device by a conventional method. Then, a metal round bar (round bar having a flat end face) having a diameter of 3 mm was inserted into the communication hole 27 through the feed water channel-side open end of the communication hole 27 to push up and remove the brine seal 28. As a result, the brine seal 28 could be easily removed without damage to the anti-telescoping device and the brine seal.

DESCRIPTION OF THE REFERENCE NUMERALS 1 membrane winding
2, 2*u*, 2*d* anti-telescoping devices
3 outer shell
5 pressure vessel
11 water collection tube
12 flow of feed water
13, 14 separation membranes
15 permeate channel material
16 feed water channel material
17 flow of condensate
18 flow of permeate
21 inner ring portion
22 outer ring portion
23 spoke portion
24 feed water channel
25 brine seal fitting groove
26 side wall portions of groove
27 communication hole (hole that communicates with feed water channel side)
28 brine seal

What is claimed is:

1. A fluid separation element comprising:
   a membrane winding having two ends and obtained by layering a separation membrane, a feed water channel material, and a permeate channel material and spirally winding them; and one or more anti-telescoping devices attached to one or both of the ends of the membrane winding and having a feed water channel provided inside, wherein a brine seal fitting groove is provided in an outer circumferential surface of the anti-telescoping device and a hole, through which a bottom of an inside of the groove and the feed water channel inside the anti-telescoping device communicate with each other, is provided.

2. The fluid separation element according to claim 1, wherein the anti-telescoping devices are attached to the both ends of the membrane winding, and wherein a brine seal is fitted into the groove of the upstream-side anti-telescoping device and no brine seal is fitted into the groove of the downstream-side anti-telescoping device.

3. The fluid separation element according to claim 1, wherein the brine seal is a sealing material having a U-shaped cross section and made of an elastic resin.

4. An anti-telescoping device for fluid separation element comprising:
   a brine seal fitting groove provided in an outer circumferential surface thereof; and
   a feed water channel provided inside, wherein a hole, through which a bottom of an inside of the groove and the feed water channel provided inside the anti-telescoping device communicate with each other, is provided.

5. The anti-telescoping device for fluid separation element according to claim 4, wherein a brine seal is filled into the brine seal filling groove.

6. The anti-telescoping device for fluid separation element according to claim 5, wherein the brine seal is a sealing material having a U-shaped cross section and made of an elastic resin.

7. A fluid separation device comprising:
   the two or more fluid separation elements according to claim 2; and
   a pressure vessel into which the fluid separation elements are loaded in series, wherein the fluid separation elements are connected in such a manner that the adjacent anti-telescoping devices are in contact with each other.

8. The fluid separation element according to claim 1, which is used by loading it together with the one or more fluid separation elements into a pressure vessel in series, wherein the fluid separation elements are connected in such a manner that the adjacent anti-telescoping devices are in contact with each other when loaded.

* * * * *